United States Patent [19]
Rossi

[11] Patent Number: 5,655,438
[45] Date of Patent: Aug. 12, 1997

[54] APPLIANCE FOR DIVERSIFIED INDOOR AND OUTDOOR COOKING

[76] Inventor: Carmen A. Rossi, 5279 Fox Trace, West Palm Beach, Fla. 33417

[21] Appl. No.: 640,225

[22] Filed: Apr. 30, 1996

Related U.S. Application Data

[63] Continuation-in-part of Ser. No. 387,062, Feb. 9, 1995, abandoned.

[51] Int. Cl.$^6$ .................................................. A47J 37/07
[52] U.S. Cl. ............................. 99/401; 99/447; 99/385; 126/25 R; 126/41 R
[58] Field of Search ........................... 99/449, 447, 401, 99/385, 400; 126/25 R, 9 R, 74, 25 C, 15 R, 21 R, 41 R

[56] References Cited

U.S. PATENT DOCUMENTS

| | | | |
|---|---|---|---|
| 3,027,887 | 8/1962 | Krohncke | 126/25 R |
| 3,611,915 | 10/1971 | Glaser et al. | 126/25 R X |
| 3,683,791 | 8/1972 | Rast, Jr. | 126/25 R X |
| 3,733,999 | 5/1973 | Bernstein | 99/421 H |
| 4,409,452 | 10/1983 | Oouchi et al. | 99/421 H |
| 4,442,824 | 4/1984 | Amici | 126/25 R X |
| 5,178,126 | 1/1993 | Beller | 126/41 R X |

*Primary Examiner*—Reginald Alexander
*Attorney, Agent, or Firm*—McHale & Slavin, P.A.

[57] ABSTRACT

A diversified cooking appliance for use outdoors or indoors which can readily be transformed to perform all the cooking modes normally performed in conventional kitchen ovens. The main body of this invention comprises two separate chambers, the lower being stationary and the upper being separably hinged to the lower. Platforms of various materials can be placed in the lower chamber to facilitate various arts of cooking while withstanding cooking temperatures. A heat source consists of the two separate adjustable burners suspended in the upper chamber. Two cold air intake apertures are provided at each side of the base of the lower chamber, with the updrafted cold air being the driving force which stimulates the hot cooking temperatures. The air is subsequently deflected between the suspended burners and the heat deflecting baffle, thereby distributing evenly hot temperatures throughout the enclosure.

13 Claims, 4 Drawing Sheets

APPLIANCE FOR DIVERSIFIED INDOOR AND OUTDOOR COOKING

This application is a continuation-in-part of application Ser. No. 08/387,062 filed on Feb. 9, 1995 which is now abandoned.

FIELD OF THE INVENTION

This invention relates generally to an indoor/outdoor cooking apparatus which can more efficiently and cleanly perform the tasks of a conventional kitchen oven.

BACKGROUND OF THE INVENTION

Most commonly known outdoor cooking equipment employs heat elements which are statically fixed below a grill or a spit where food to be cooked is placed. Most known outdoor cooking systems are generally used to grill, barbecue or spit rotisserie the usual common categories of food, occasionally with unappealing results. Usually, food to be cooked in prior art equipment is placed on a grill, a spit rotisserie mechanism, or in a container utensil and cooked over the heat source such as solid fuels, natural or bottled gas, or cost consuming electric elements. In any case, the operator of such prior art cooking equipment is exposed to spontaneous flame eruption hazards due to fats and food juices dripping into the heat source. Accordingly, operators are continually confronted with the following operational problems:

a. The control and collection of the rendered food fats and juice drippings;

b. The emission of offensive smoke and odors into the surrounding atmosphere resulting from the burning of encrusted fats or other food residue;

c. Poorly circulated or regulated cooking temperatures;

d. Tedious disassembly and reassembly which make for difficult preventative maintenance of equipment by the average layman;

e. The tedious and laborious aftermath of cleaning the lower compartment wherein fixed heating elements and associated components are installed;

f. Space limitations for roasting or rotisserie cooking of large size food portions such as standing ribs or turkey;

The following U.S. Patent references disclose one or more of the foregoing discrepancies:

U.S. Pat. No. 4,442,824 to Amici discloses an Accessory Grill Converter which places the heat source above the food being cooked to eliminate the hazardous spontaneous flame eruptions. This invention also discloses the use of rocks placed on the foraminous floor for transferring heat within the enclosure. Amici cites the placement of a heat shield over the heat elements, but merely for their protection. No mention is cited that the heat shield has reflective or deflective power. Moreover, the necessary arrangement of the rocks deprives the enclosure of valuable space for rotisserie cooking and/or the ability to cook large food portions. Amici also cites an embodied resolution of the hazardous flame flare up problem caused by the dripping of fats and food juices, but does not mention the disposition of such accumulations at the base of the enclosure.

U.S. Pat. No. 4,884,554 to Yanagida discloses the placement of a solid fuel heat source below the food being cooked, whereby the dripping fats and food juices will cause frequent hazardous flame eruptions and excess smoke emissions into the atmosphere. The disclosure also provides limited space for rotisserie cooking of large portions of food.

U.S. Pat. No. 5,184,540 to Riccio discloses an elaborate, intricately designed, rotisserie mechanism apparently intended for commercial use. The '540 system again places the heat source below the food being cooked, thus causing the usual flame eruptions due to the dripping fats and food juices coming in contact with the heat source. This system will require laborious cleaning efforts and will present other preventative maintenance problems.

U.S. Pat. No. 5,213,027 to Tsotsos et al. discloses an elaborately designed grill assembly which is expensive to produce and costly for the average user. Said assembly again places the primary heat source below the food being cooked thereby producing the usual flame eruption hazard. Also, the related tedious cleanup problems might, in time, be discouraging to the user. This would lead to contamination of the lower compartment, or non-use of the unit altogether.

SUMMARY OF THE INVENTION

The present invention provides a cooking enclosure apparatus comprising an upper and lower chamber with as few primary components as practicable, yet sufficient in number to maintain trouble free operation with minimal preventative maintenance. The apparatus disclosed is a unique universal cooking appliance employing novel dynamic circulation of hot cooking temperatures. The device can also perform a full range of outdoor cooking tasks, both effectively and efficiently. Additionally, the device can integrate a full range of diversified cooking tasks as normally performed in conventional kitchen ovens, namely: broiling, baking, utensil type cooking, roasting of large food portions including turkey, standing rib or other roasts. These tasks can be performed while containing the dripping fats and food juices in the reclamation pan provided below the food being cooked.

At the same time, the present invention insures and maintains safety standard measures, while minimizing cleaning and preventative maintenance requirements. Moreover, with the heating elements installed above the food being cooked, all of the cooking modes will be smokeless including instances when food is severely charred. Wood flavors can also be added if desired, with ample space available for trouble free, heavy-duty rotisserie cooking.

Accordingly, it is an object of the present invention to provide a cooking apparatus which is simple and robust in design, for performing a wide variety of cooking techniques.

It is yet another object of the present invention to provide a cooking apparatus which is conveniently capable of both indoor and outdoor use.

It is still another object of the present invention to provide a cooking apparatus with a heating element suspended above an accessible cooking chamber, wherein the heat is uniquely circulated for energy and time efficient cooking.

It is yet a related object of the present invention to provide a cooking apparatus for circulating heat without the use of rocks so that the cooking chamber is more voluminous.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
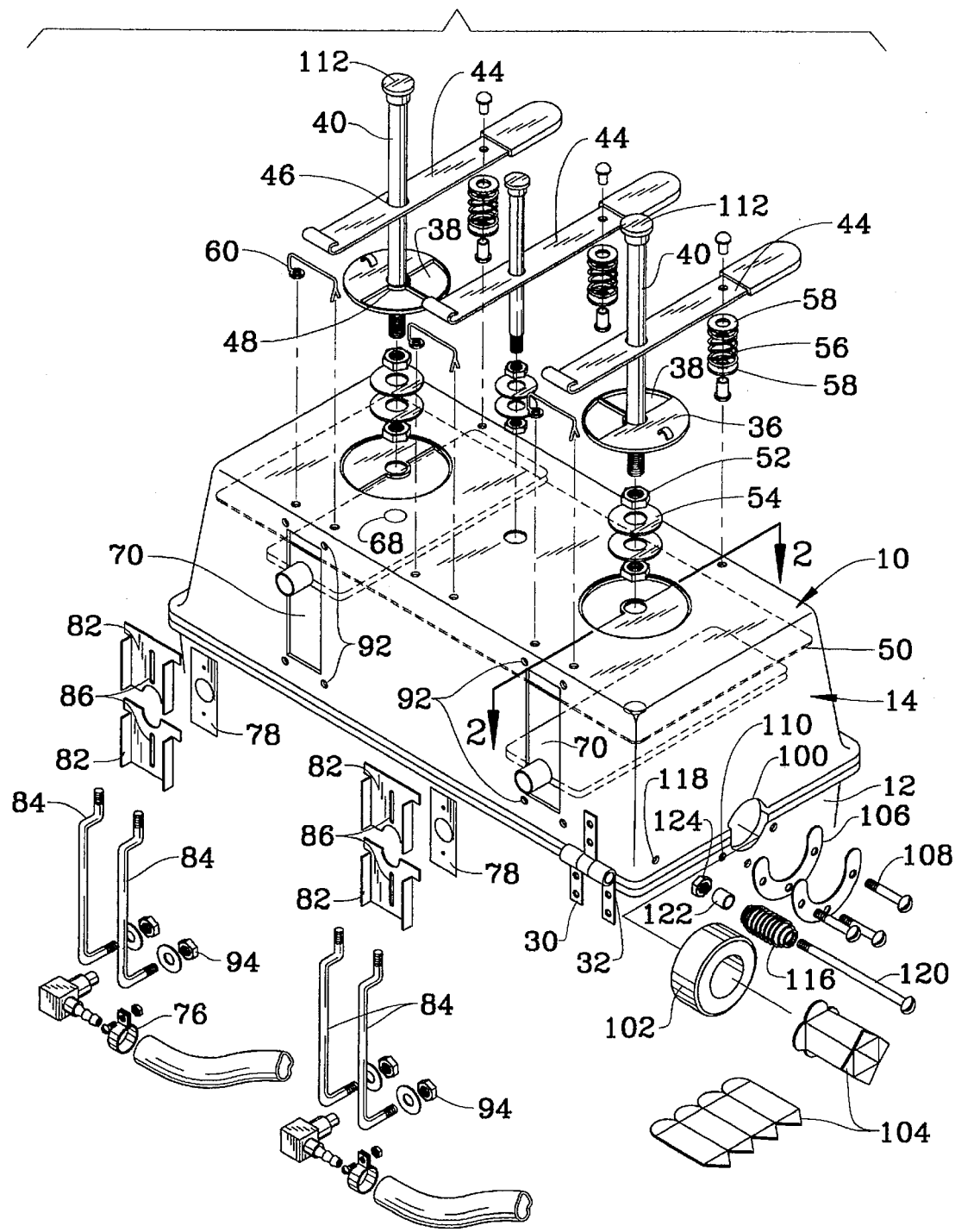
FIG. 1 shows an isometric view of the exploded parts provided for installation on the exterior of the upper chamber assembly.

Although the invention has been described in terms of a specific embodiment, it will be readily apparent to those skilled in this art that various modifications, rearrangements and substitutions can be made without departing from the spirit of the invention. The scope of the invention is defined by the claims appended hereto. The perceived modes of making and carrying out the present invention can best be ascertained by the referenced numbered features, parts and components as follows:

Referring now to FIG. 1, the drawing illustrates an isometric view of the parts and components provided for the attachment to the exterior and coupled with the major components installed in the interior of an enclosure 10 comprising of an upper chamber 14 and a lower chamber 12. The chambers 12 and 14 are joined together with separable hinges 30 which are held together with removable pins 32.

Figure 2:
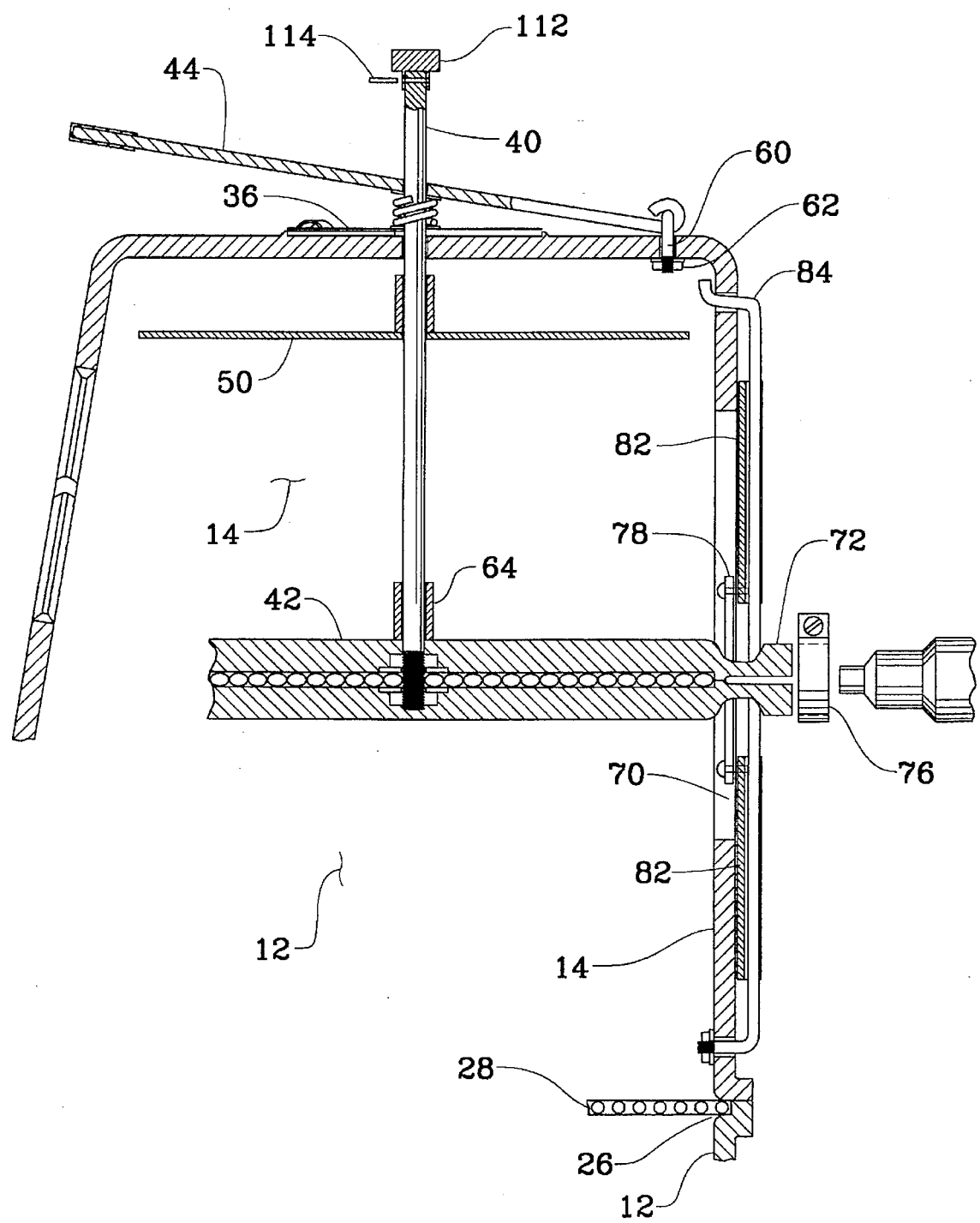
FIG. 2 shows a cross section view of FIG. 1 along cut 2—2 which details assembly of various exploded parts of FIG. 1.

Referring also to FIG. 2, this drawing discloses a cross sectional view along cut 2—2 of FIG. 1, with the rear wall 16 of chambers 12 and 14 being at a right angles with relation to the longitudinal axis of the enclosure opening. The front walls 18 of chambers 12 and 14 are trapezoid in form with relation to the top 20 and the bottom surfaces 22 of the enclosure 10 (See FIGS. 2 and 4) and are formed at a slight angle from top to center and bottom to center as well. The shape of each side of the chambers conforms to the configuration of the front side 18 and the rear side 16 of said enclosure 10 assembly.

Figure 3A:
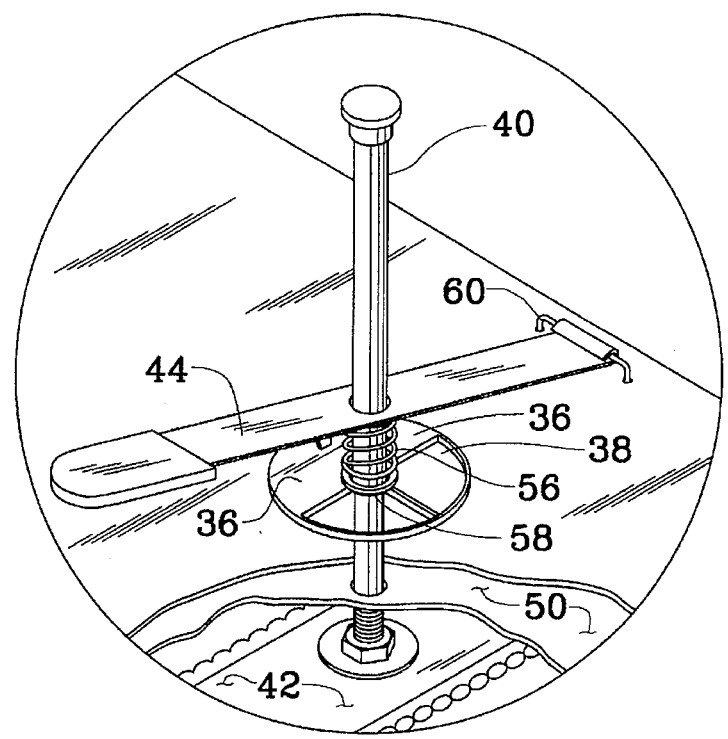
FIG. 3A shows assembly details for a manually operated rotary shutter and a single gas fired burner suspended with a rod and held in place with a spring loaded bar.
Figure 3B:
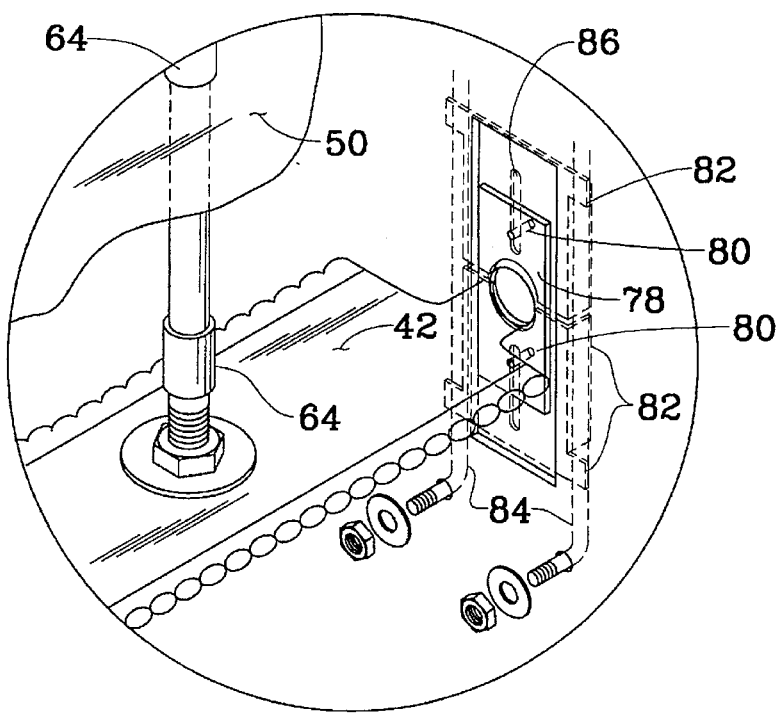
FIG. 3B shows the rear shutter assembly installed on the exterior rear of the upper chamber.

FIG. 2 shows both chambers 12 and 14 having lip shaped reliefs 26 formed on the inner edges of the opening on which the grill 28 is placed for the conventional grilling and barbecue modes of cooking. Referring also to FIG. 3A, the upper chamber 12 is provided with two circular apertures 34 on the top surface to allow the escape of the updraft flow of cold air mixed with some of the circulating hot air within both chambers 12 and 14. The latter is illustrated with arrows 98 in drawing FIG. 4. Each said aperture 34 is equipped with a manually adjustable circular disc 36 each having two quarter round openings 38. These rotary damper discs 36 are mounted over said apertures 34 and are held in place and are allowed to pivot on rod 40. The rod 40 is also used to adjust he height of each individual single gas fired burner 42 as shown suspended in FIGS. 1, 2, 3, and 4. While embodied as shown, these rotary damper discs are not limited to the design configuration shown. Other adjustable methods of allowing air into the cooking chamber 10 might prove to be equally effective.

Following the adjustment of each, or both, of the burners 42, the burners are held firmly in place with a sturdy sheet metal bar 44 which is provided with a hole 46. The hole 46 must coincide with hole 48 located in the center of circular aperture 34 through which rod 40 must be inserted. Rod 40 continues downward through a clearance hole 66 provided in flat sheet metal heat deflecting baffle 50 thereafter joining the single adjustable gas fired burned 42 through hole 68 wherein said rod 40 is firmly attached with mounting hardware hex nuts 52 and large washers 54. The rods 40 shown in FIG. 2 are provided with "easy grip" heat resistant knobs 112 which are secured with pins 114. The bar 4 must be spring loaded with spring 56 and hardened steel washer 58. The bar 44 is hinge mounted on the top surface of upper chamber 12 on the centerline with the hole 48 in the center of circular aperture 34 with a "U" shaped stud 60, threaded at both ends, and four nuts 62. Two of the nuts 62 are backing nuts to avoid studs 60 from becoming loose in time.

Two single independently adjustable burners 42 are suspended and held firmly in place with said rod 40 which extends through hole 66. The heat deflecting baffle 50 is suspended horizontally above both burners 42. The rod 40 continues to project upwards through the hole 48 provided in the center of circular aperture 34 and subsequently protruding through a hole 46 provided through spring loaded sheet metal bar 44. The bar 44 when manually depressed permits the vertical adjustment of the gas fired burners 42. The rectangular sheet metal heat deflecting baffle 50 is horizontally and longitudinally suspended at a predetermined space with tubular spacer 64 above the burners 42. The baffle 50, being also adjustable in height, is suspended in the same manner as the burners 42 with the use of similar parts and mounting hardware, namely: rod 40, spring 56, washers 54 and spring loaded bar 44. The baffle 50 is held firmly in place and the bar 44 is also hinge mounted with a "U" shaped stud 60 and four hex nuts 62. A hole 68 is provided on the top surface of the upper chamber to coincide with the hole 46 provided in the spring loaded bar 44. Holes 46, 66, and 68 must be located on same centerline with respect to one another and on the exact centerline from front to back and side to side of the top surface of the upper chamber 12. The heat baffle 50 adjusting rod 40 must extend through holes 46, 66 and 68.

Referring again to FIG. 1 and FIG. 3B, shown are two vertical rectangular apertures 70 on centerline with the adjustable burners 42. The gas receiving end 72 of the burners 42 have the gas supply nozzles securely attached with regulation type fittings (not shown) or with commonly used hose clamps 76, and extend through the apertures 70. The apertures 70 must be kept covered to prevent unwanted air from entering the enclosure 10. The apertures 70 must remain covered at all times by employing the intended loosely fitted sheet metal shutter assemblies which are uniquely designed. Each assembly is comprised of component parts 78, 82 and 84. The inner shutter blade 78 is provided with a hole 88 through which the gas receiving end 72 of the burners 42 extends. The blade 78 is raised and lowered simultaneously when the height of the burner(s) 42 is/are changed. The inner blades 78 are each equipped with two pins 80 which extend through elongated apertures 86 which are provided in the four outer shutter blades 82. The pins 80 simultaneously assist the raising or lowering of the outer shutter blades as the height of the burner(s) is/are changed. The outer blades 82 are held loosely in place over the rectangular apertures 70 with four wire guide rails 84 to allow the blades 82 to fall via the pull of gravity during the adjustment of the burners 42. Each wire guide rail is "S" formed at the upper end for easy insertion in holes 92 provided in the rear wall of the upper chamber 12. Each rail 84 is rigidly secured with two of the eight hex nuts 94 as provided, with one of the two nuts being backing nuts to insure permanent rigidity. Two wire wound eat retarding 116 handles, as shown in FIG. 1, are provided for the lower front sides of the upper chamber 12 and are securely fastened through holes 118 with bolt 120, lock washer 122, and lock nuts 124.

Also included on the opening edges of the side walls of the chambers 12 and 14 in the center from front to back walls are four half round cutouts 100, one for each side edge of the chambers. The cutouts 100 are provided for easy insertion and removal of special bearing 102, the inner race of the bearing 102 having a square aperture 104 provided for the insertion of a heavy duty square bar (not shown) used for the rotisserie cooking of large portions of food. The bearings 102 are loosely inserted between two of eight horse shoe "U" shaped bearing retainers 106, two for each side of the opening of the lower chamber 14. The retainers are firmly secured with machine screws and nuts 108 on center line with the holes 110 provided on the periphery of the half round cutouts 100. The special bearing feature 102 provides rotational ease with little strain on a motor (not shown) for large quantities of heavier foods in rotisserie cooking.

Figure 4:
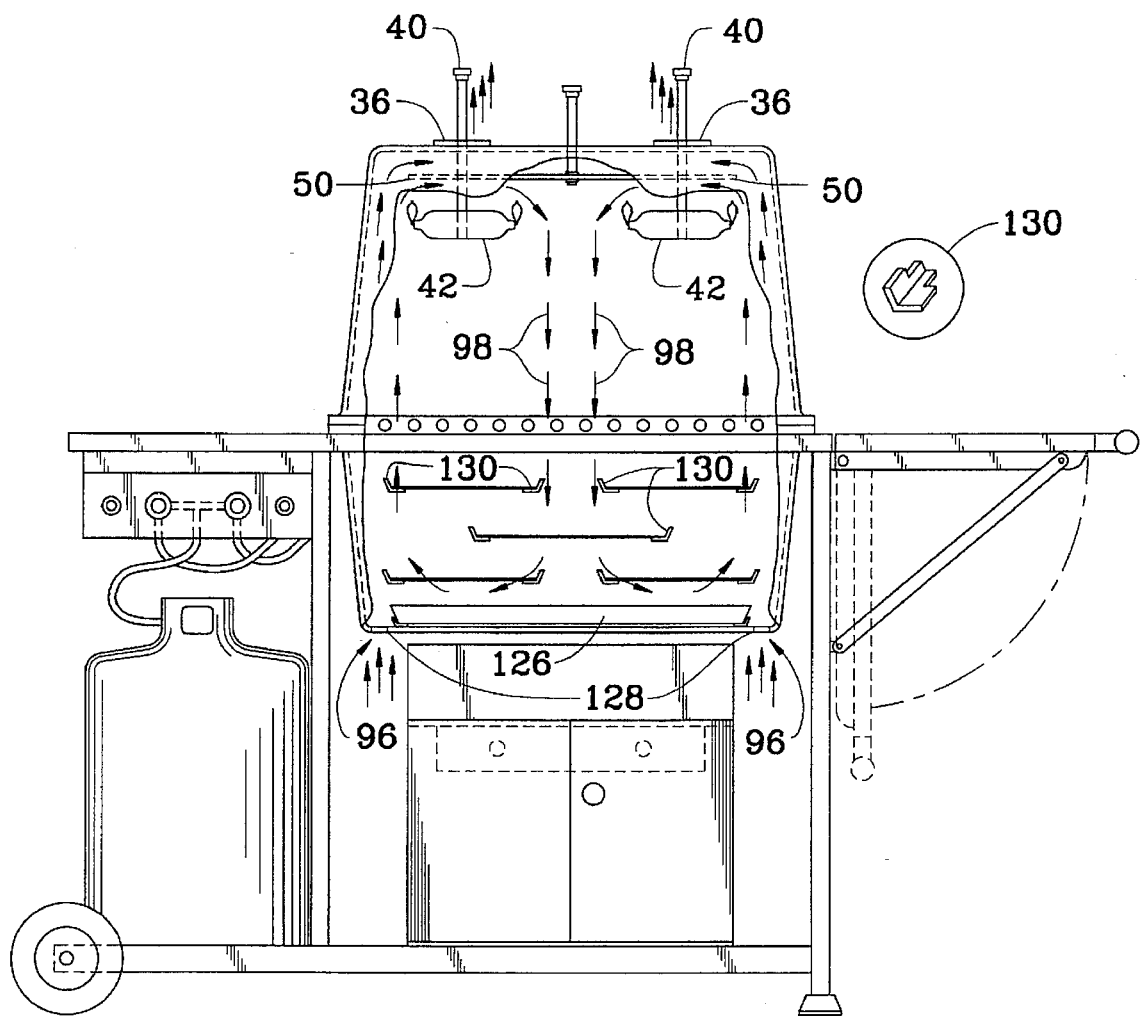
FIG. 4 illustrates a cut away view of the enclosure assembly with the primary components in place and the associated circulating cooking temperatures as depicted by the flow pattern of the arrows. The reclamation utensil for catching the dripping fags and food juice, as well as the varied levels of platforms for the placement of food to be cooked is also shown.

FIG. 4 illustrates the location of the two vital cold air intake apertures 96 which provide the vitally required updraft of incoming cold air which infiltrates the under surface of the heat deflecting baffle, thus forcibly stimulating the motivation of the intense cooking temperatures to circulate the entire enclosure. This directional pattern of the hot cooking temperatures is indicated by the pattern of pointed arrows shown as element 98 in FIG. 4. FIG. 4 also shows a removable, hygienically appealing, easy to clean, porcelain coated reclamation utensil 126, as provided at the base of the lower chamber 14, and positioned horizontally adjacent to the cold intake apertures 96. Barriers 128 are provided to prevent blocking of the apertures 96. Inserts 130 are mounted on either side of the interior of the lower chamber to hold cooking racks at various levels. Such inserts 130 might be insertable or formed on the chamber. The enclosure 10, with all parts and components installed in place, is suitable for mounting on any configuration of portable cart, frame, or support assembly. As such, this embodiment is not limited to the arrangement shown in FIG. 4.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A diversified cooking appliance for cooking food compatible for outdoor or indoor use comprising:

an cooking enclosure formed from separable upper and lower chambers held together with two separable hinges, said chambers each having a front wall, a rear wall, and side walls, said upper chamber having a top and said bottom chamber having a bottom;

a pair of independent height adjustable single gas fired burners with a gas receiving end said burners suspended perpendicular to said rear wall of said upper chamber, and above said cooking food in said enclosure;

a first pair of adjustable shutter assemblies mounted atop a pair of circular indentations in said upper chamber, wherein said assemblies have two round apertures to allow the escape of spent updrafts of cold air as mixed with hot air;

an adjustable heat deflecting baffle formed from a flat sheet of metal which is positioned above said suspended burners;

a second pair of shutter assemblies mounted over rectangular apertures through said upper chamber rear wall, said assemblies having a plurality of slidable blades, each said assembly comprised of an inner blade, two outer blades and two wire guide rails, wherein said blades are slidably mounted to said wire guide rails, and said inner blade is securely attached to said gas receiving end of said suspended burner, with said gas receiving end extending through said rear wall aperture.

2. The diversified cooking appliance of claim 1, wherein said first pair of shutter assemblies are each comprised of a manually adjustable circular rotary shutter seated snugly atop said circular indentation.

3. The diversified cooking appliance of claim 1, wherein said chambers further include adjoining half round cutouts in the center of said side walls to form a circular opening, said opening receiving a pair of bearing retainer and bearing means for supporting a rotisserie mechanism.

4. The diversified cooking appliance of claim 1, wherein said hinge includes a removable hinge pin which allows for complete separation of said upper and lower chambers.

5. The diversified cooking appliance of claim 1, wherein said lower chamber further includes a plurality of air intake apertures which are required for the supply of an updrafted flow of cold air.

6. The diversified cooking appliance of claim 5, wherein said lower chamber includes two air intake apertures located through the bottom and adjacent each side wall of said lower chamber.

7. The diversified cooking appliance of claim 1, wherein said burners are adjustable in height via an attached adjustment rod means which protrudes out of said top of said upper chamber.

8. The diversified cooking appliance of claim 7, wherein said burner adjustment rod means extends through the center of said circular adjustment shutter assemblies in said upper chamber.

9. The diversified cooking appliance of claim 1, wherein said deflection baffle is adjustable via an attached adjustment rod means.

10. The diversified cooking appliance of claim 9, wherein said deflection baffle adjustment rod means extends through said top of said upper chamber.

11. A diversified cooking appliance for indoor and outdoor cooking of food comprised of a hinged enclosure with an upper and lower chamber each having front, rear, and side walls, said upper chamber having a top and said lower chamber having a bottom; a pair of independently mounted gas burners which are suspended from said top of said upper chamber via adjustable mounting rods extending through said top of said upper chamber; a pair of slidably mounted rectangular shutter assemblies each with a plurality of shutter blades sliding over a rectangular aperture in said rear wall of said upper chamber, with at least one shutter blade attached to one said burner so that said shutter opens and closes in response to vertical adjustment of said burner; a vertically adjustable heat deflection baffle placed between said burners and said top of said upper chamber; a pair of circular shutter assemblies mounted through holes in said top of said upper chamber; a pair of air intake apertures located through said bottom of said lower chamber; wherein air enters through said intake apertures, is heated via said burners, and is circulated via air entering and exiting said adjustable rectangular and circular shutter assemblies.

12. The diversified cooking appliance of claim 11, wherein said burners are adjustable in height via an attached adjustment rod means which protrudes out said top of said upper chamber and through the center of said circular shutter assemblies.

13. The diversified cooking appliance of claim 11, wherein said deflection baffle is adjustable via an attached adjustment rod means which extends through said top of said upper chamber.

* * * * *